Patented Aug. 15, 1933

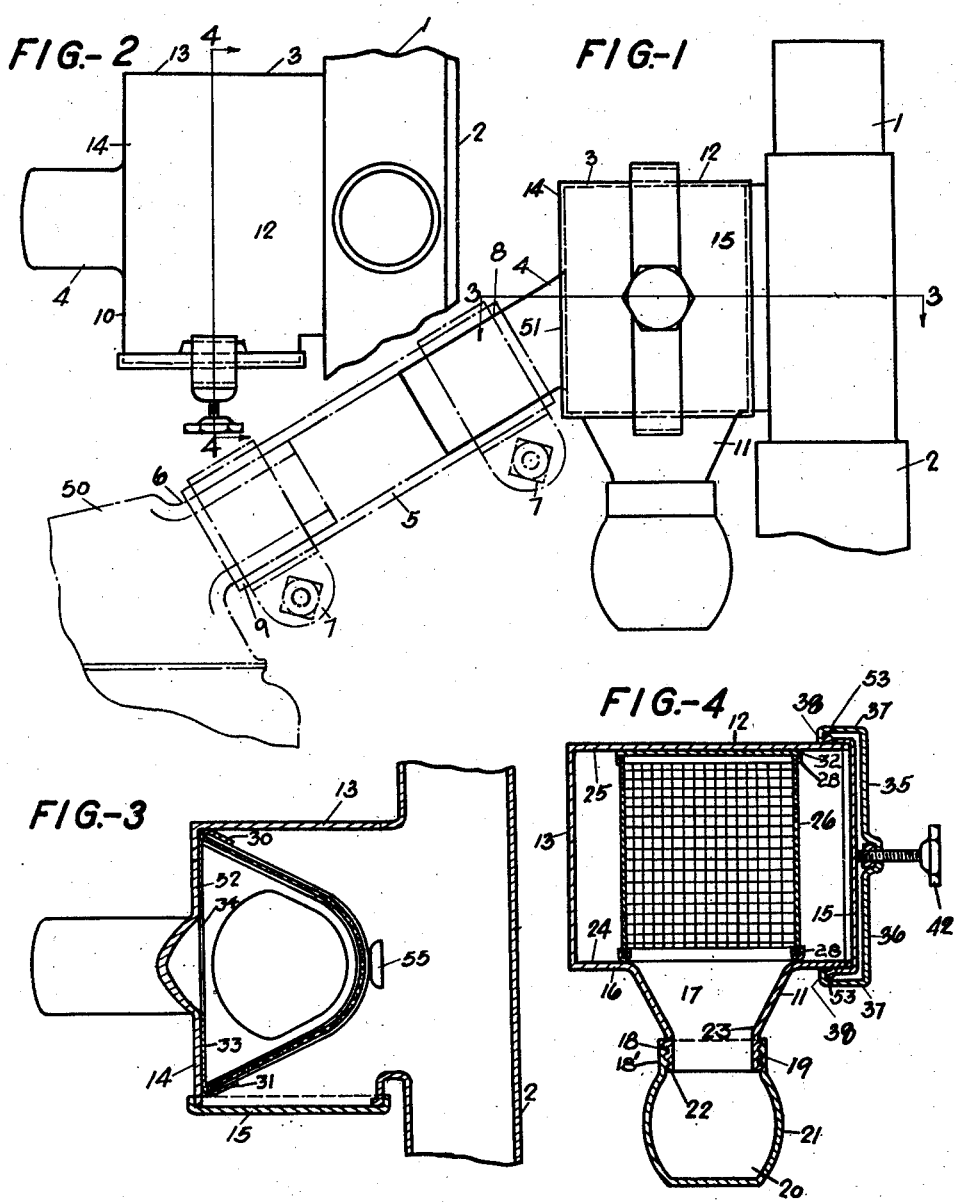

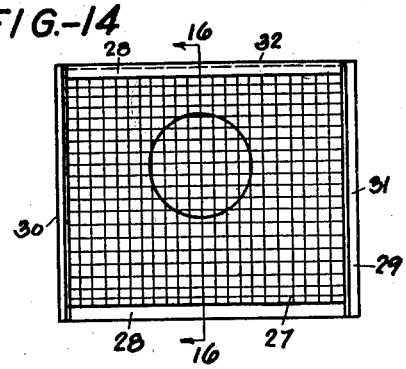

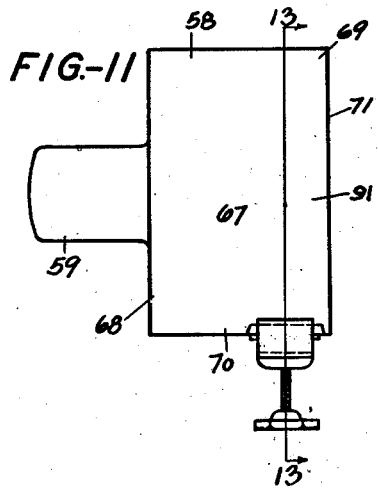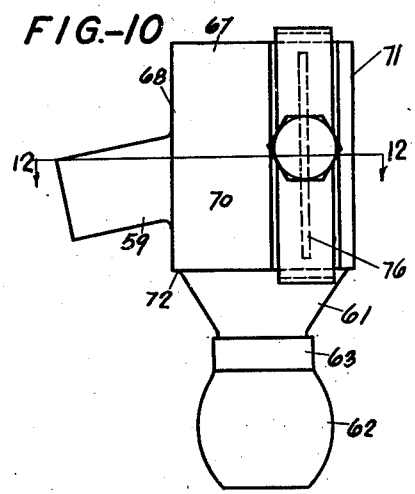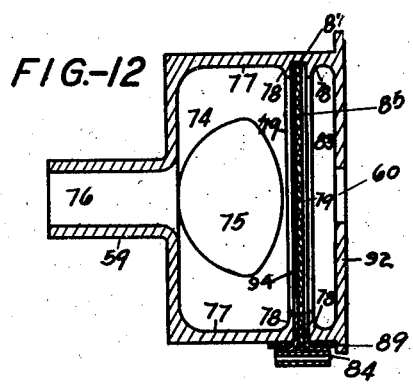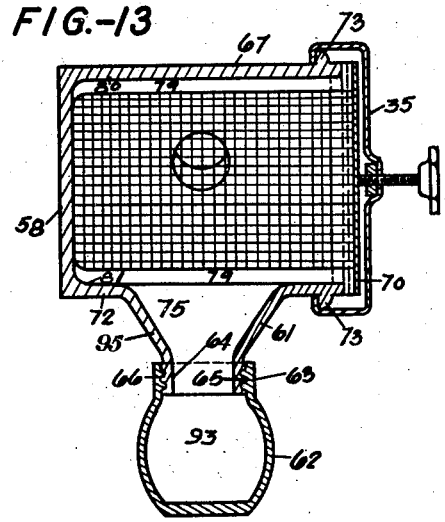

1,922,863

UNITED STATES PATENT OFFICE 1,922,863

RADIATOR AND FILTER THEREFOR

Joseph Rendelman and Walter Nelson Holstrum, Philadelphia, Pa., assignors to said Rendelman and said Holstrum, as Trustees Application January 8, 1929. Serial No. 331,022

6 Claims. (Cl. 257—125)

This invention relates to filtering devices for automotive mechanisms and has for its object the provision of a filtering device which shall be simple in construction, which shall be easy to manufacture and assemble and which shall constitute an integral part of the fluid system of the said automotive mechanism.

As is known, fluids used in automotive mechanisms, such as automotive vehicles, and especially those used for cooling the engine in what is commonly known as the radiator system, are forced through the system by means of pumps. These cause the fluid to continually circulate in the well known manner and results in a cooling effect on the engine. In its course through the system the fluid picks up and carries along particles of dirt, dust, rust and other foreign substances. These clog the system in whole or in part with a resulting loss in the efficiency of the device. To remedy this defect in the fluid system this invention has been designed.

This invention has been designed not only to meet the above problem but also to improve on former attempts made to meet this problem. The inventors are aware that filter devices have been designed which are adapted to be inserted into the fluid system. These are open to many objections, among which are the lack of rigidity, the difficulty of attachment and the necessity for bracing devices. As a result of these defects, these devices are liable to become easily detached while in use or to function improperly due to vibration, or to be entirely impractical because of the necessity of using bracing devices. To meet this problem the inventors have conceived the idea of incorporating their filter device into and make the same an integral part of one of the firm fixed members of the fluid system such as the radiator.

Another object of this invention is the provision of a filter device for the fluid system device of automotive mechanisms which shall form an integral part of one of the firm fixed members of the fluid system device.

Another object of this invention is to provide a fluid system device for automotive mechanisms one of the members of which has a filter device within as a component part.

Another object of this invention is to provide a radiator for automotive mechanisms having a filter device as a component part thereof.

Another object of this invention is the provision of a filter device for the fluid system device of automotive mechanisms which may be attached directly to and form an integral part of the radiator device.

Another object of this invention is the provision of a filter device for the fluid system device of an automotive vehicle which shall form an integral part of one of the firm fixed members of the fluid system.

Another object of this invention is to provide a fluid system device for automotive vehicles, one of the members of which has a filter device as a component part.

Another object of this invention is to provide a radiator for an automotive vehicle having a filter as a component part.

Another object of this invention is the provision of a filter device for the fluid system of an automotive vehicle which may be attached directly to and form an integral part of the radiator device.

Another object of our invention is to provide a filter device with a removable means whereby the dirt, dust, rust or other foreign substance collected as a result of or impounded by the filter device may be periodically removed.

Another object of this invention is to provide a filter device with a threadably attachable receiver for the dirt, dust, rust or other foreign substance collected or impounded by the filter device.

With the various objects of the present invention both singly and collectively in view, the invention consists, primarily in the novel fluid system device having a filter element as a component of one of the fixed parts thereof hereinafter more fully set forth; and, the invention consists furthermore in the novel elements hereinafter more fully set forth; and, the invention consists furthermore in the novel arrangements, combinations and subcombinations of the various devices and parts, as well as the details of construction of the said parts, all of which will be more fully described in the following specification and then finally embodied in the clauses of the claims which are appended to and which form an essential part of the said specification.

The invention is illustrated in the accompanying drawings, in which:—

Figure 1 is a side view showing a radiator, having a filter device as a component part thereof, assembled with the engine—the connecting means and the engine being shown in dotted lines.

Figure 2 is a top view of a portion of the radiator showing the filter device which forms an integral part thereof, the remaining portions of the radiator being broken away.

Figure 3 is a section on the line 3—3 of Figure 1, the locking means therefor being omitted.

Figure 4 is a section on the line 4—4 of Figure 2.

Figure 10 is a side view of a modification of the device shown in Figure 11.

Figure 11 is a top view of the same.

Figure 12 is a section on the line 12—12 of Figure 10.

Figure 13 is a section on the line 13—13 of Figure 11.

Figure 14 is a front view of the filter element used in the modification shown in Figures 1, 2, 3, 4, showing in addition the opening in the front which permits the free flow of fluids thereinto.

Figure 15 is a bottom view of the screen shown in Figure 14.

Figure 16 is a section on the lines 16—16 of Figure 14.

Figure 17 is a front view of the locking plate used in the modification shown in Figures 1, 2, 3, 4.

Figure 18 is a section on the line 18—18 of Figure 17.

Figure 6 is a section on the line 6—6 of Figure 5.

Figure 5 is a front view of the locking device used.

Figure 7 is a side view of the filter element used in the modification shown in Figures 12 and 13.

Figure 8 is a front view of the same.

Figure 9 is a section on the line 9—9 of Figure 8.

Referring more particularly to the drawings wherein similar reference numerals denote similar parts, reference numeral 1 denotes a radiator which forms one of the members of the fluid cooling device of an automotive vehicle. The radiator 1 is composed of a radiator portion 2 and a filter device 3. The filter device 3 has extending from one of the sides thereof a tubular member 4. One of the ends 8 of the connecting tube 5 is adapted to fit over the tubular member 4. The other end 9 of the connecting tube 5 is adapted to fit over the tubular member 6 carried by the engine 50. Clamps 7 serve to firmly clamp the ends 8 and 9 of the tube 5 in place.

The filter device 3 is composed of a main body 10, a tubular member 4 and a lower member 11, a filter member 26 and a locking device 35.

The main body 10 is an integral part of the radiator 2. The main body 10 is hollow and has a top bounding wall 12, a fixed side bounding wall 13, a removable side bounding wall 15, a front bounding wall 14 and a bottom bounding wall 16. These walls combine to form and bound the chamber 23.

Carried by the bottom bounding wall 16 is the lower member 11. The lower member is composed of a hollow inverted cone shaped member 23 and a cup member 21. The member 23 terminates in a tubular member 18. Formed on the outside surface of the tubular member 18 are threads 22. The member 21 is cup shaped and terminates in a tubular member 18'. Formed on the inside surface of the tubular member 18' are threads 19. These are adapted to cooperate with the threads 22 carried by the member 18, thus adapting the cup member to be threadably attached to the member 11. The bounding walls of the member 11 form a chamber 17 and the bounding walls of the cup member 21 form a chamber 20 therein.

Removably carried within the chamber 23 of the member 10 is the filter element 26. The filter element 26 is composed of filter material 27 (shown in this case as wire netting). This resembles substantially a half circle in shape. The lateral edges of the filter element 27 are reinforced by strips 28. To further stiffen the filter element 27 there is added a member 29 which is composed of a front wall 33, two arms 30 and 31 and a rear wall 32. The outside edges of the wall 32 are firmly connected to one of the binding strips 28 and the arms 30 and 31 are firmly connected to the lower edges of the binding strips 28 as shown. An opening 34 is formed in the front wall of the member 29. A lug 55 is formed on the inner surface of the lower wall 16. This serves to hold the filter device 26 against lateral displacement due to pressure of the liquid. The removable side bounding wall 15 is composed of a front member 56, side walls 57 and 90. The locking device 35 is composed of a strip 36 and a screw 42. Carried by the strip 36 are arms 37 and 38. Formed on the strip 36 are arms 39 terminating in a flat portion 40. The arms 39 and the portion 40 combine to make an excrescence 54 in the walls 36. Firmly fixed in the excrescence 54 is the element 41. This serves to strengthen the excrescence 54 and also to provide an element to carry the screw 42. Formed on the outer surface of the upper wall 12 and lower wall 16 are the lugs 53. These cooperate with the arms 38 and the locking member 35 to hold the same in place.

Although the manner of operation is believed to be clear from the above description, the following detailed description is added for the purpose of obviating any possible misunderstanding.

The direction of flow of the fluid in the fluid filter system is from the engine 9, through the tubular member 6, thence through the tube 5, through the tubular member 4, through the opening formed by the joinder of the tubular member 4 and the wall 14, through the opening 34 in the wall 33 of the member 29, into the chamber 23, through the filter material 27 of the filter element 26, into the radiator portion 2 of the radiator 1, thence downwardly through the radiator portion and back into the bottom (not shown) of the engine 50. Any dirt, dust, rust or other foreign substance carried by the fluid is impounded by the filter material 28 and the force of gravity carries the same downwardly in the chamber 23, through the chamber 17 of the element 22 and thence downwardly into the chamber 20 of the receiving member or cup 21.

We will assume that the device is assembled as shown in Figures 1 to 4 inclusive and that it is to desired to clean the same. The screw 42 of the locking member 35 is turned in such a manner as to actuate the same outwardly from the removable wall 15. When this has been loosened sufficiently, the element 36 is actuated in a direction parallel to the lugs 53 a sufficient distance to clear the same. The locking device 35 is thus made free of the filter device 3 and can be removed therefrom. The wall 15 is now removed. The filter element 26 can now be removed through the opening formed by the removal of the wall 15. The filter element is cleaned or repaired and is ready for replacement. To remove the receiving element or cup 21, it is only necessary to turn the same in a direction necessary to threadably detach the cup 21 from the member 22. The foreign substance which is in the chamber 20 of the cup 21 can now be removed.

To assemble the device for operative use, the steps outlined above are reversed. The cup 21 is screwed onto the member 22; the filter element 26 is now inserted into the chamber 23. In its operative position the wall 32 of the filter element 26 contacts with the inner surface 25 of the upper bounding wall 12 of the member 10. One of the reinforcing strips 28 rests on the inner surface 24 of the lower bounding wall 16. (See Figure 4.) The wall 33 contacts against the inner surface 52 of the bounding wall 14 and the opening 34 registers substantially with the opening formed at the point where the tubular member 4 meets the wall 14. (See Figure 3.) The removable wall 15 is now put in place. The locking device 35 is slid into position so that the arms 38 are retained by the lugs 53. The screw 42 is then rotated in a direction towards the wall 15 until it contacts with the same and firmly presses the wall 15 in operative position.

Instead of using the device shown in Figures 1, 2, 3 and 4 having entirely detachable walls and a curved filter element and an opening joining the filter device and the radiator device equal to practically the entire area of one of the sides of the filter device, a modification may be constructed similar to that shown in Figures 10, 11, 12 and 13 wherein a straight filter device is used and wherein, further, the hole which leads from the filter device to the radiator portion is not equal to the entire area of the filter device.

Referring more particularly to the disclosure of Figures 10, 11, 12 and 13, and Figures 8, 9 and 7 which show details of construction, reference numeral 69 denotes a filter device which is hollow and is composed of a main body 91, a tubular element 59, a filter element 84, a locking device 35 and a lower portion 61. The main body portion 91 is composed of a top bounding wall 67, a side bounding wall 58 and 70, a front bounding wall 68, a rear bounding wall 92 and a lower bounding wall 72. The walls 58, 67, 68, 70, 72 and 92 combining to bound and form a cavity 74 in the main body portion 91. Formed on the front wall 68 is a tubular element 59. The tubular element 59 has a cavity 76 formed therein which extends to and merges with the cavity 74 in the main body portion 91. The wall 92 forms part of both the radiator portion and of the filter device and serves to separate the filter device from the radiator. Formed in the wall 92 is an opening 60. This permits the flow of liquid from the chamber 74 into the radiator device (not shown). Carried by the lower wall 72 is a lower member 61. The lower member 61 is composed of an inverted cone shaped member 95 and a cup member 62. The member 95 terminates in a collar 64 which has the threads 65 formed thereon. Carried by the cup member 62 is a collar 63 which has the threads 66 formed thereon. The threads 65 cooperate with the threads 66 and serve as a means adapting the cup 62 to be threadedly attached to and detached from the member 95. The walls of the member 95 serve to form and bound the cavity 75, while the walls of the cup member 62 serve to form and bound the cavity 93. The structure of the element 61 is exactly similar to the structure of the element 11 disclosed in the Figures 1, 2, 3 and 4.

The filter device 84 is composed of a filter element 85, a reinforcing strip 86 formed around the filter element 85, and a front plate 87 firmly attached to the filter element 85 and reinforcing strips 86 by the arms 88. For the purpose of preventing leakage a gasket 89 is carried by the filter element 85 adjacent to the inner surface of the front plate 87.

Formed on the inner faces 77 of each of the walls 58 and 70 is a pair of parallel spaced lugs 78. Formed on each of the inner faces 80 and 81 of the walls 67 and 72 respectively is a pair of parallel spaced lugs 79. Each pair of parallel lugs 78 and 79 combine to form a slot 94. The slots 94 form a guide and retaining means for the filter element 85, retaining the same against lateral displacement due to the pressure exerted upon the filter device by the fluid. A slot 76 is formed in the face 70 of the main body 91. This makes possible the insertion of the filter element 85 into the chamber 74 and its withdrawal from the same when desired.

A locking device 35, previously described, cooperates with lugs 73 formed on the upper and lower faces 67 and 72 to lock the filter device 84 in operative position.

The modification of the device shown in Figures 10, 11, 12 and 13 functions exactly like that shown in Figures 1, 2, 3 and 4. The fluid enters through the opening 76 in the arm 59, goes through the chamber 74, through the filter element 85, through the opening 60 in the wall 92 and thence into the radiator. Any dust, rust, dirt or other foreign substance impounded by the filter element 85 is actuated downward by the force of gravity, goes through the chamber 75 and into the chamber 93 of the receptacle 62.

The device shown in Figures 10, 11, 12 and 13 differs from that shown in Figures 1, 2, 3 and 4 only in the facts that the removable wall 15 has been omitted and a stationary wall 70 has been substituted therefor, that the area of opening communicating with the radiator device has been decreased, and that a plane surface filter element has been substituted for a curved surface. The structure of the filter device 84 including the lugs 78, 79 and the slots 94 form the subject matter of an invention previously made by Joseph Rendelman and disclosed in United States Patent No. 1,857,606, issued May 10, 1932. They are here incorporated into the combination of the filter device forming an integral part of one of the firm fixed members of the fluid system device of an automotive mechanism and is here claimed only as part of the said combination.

It is to be understood that the above disclosure is by the way of illustration only and not by the way of limitation since many changes may be made in the device disclosed without departing from the spirit of our invention. For instance, instead of making the filter device an integral part of the radiator of the fluid system device, it may be made an integral part of the motor or any other firm fixed member desired: Or the material from which the filter device or any part thereof is made may be changed: Or the shape of the filter device or any part thereof may be changed: Or the type of locking device used may be changed: Or changes may be made in any subcombination of the individual elements combining to make the device here disclosed: Or gaskets may be inserted wherever desired in order to obviate any possibility of leakage: Or cooperating threads may be interchanged as desired, such as the placing of the threads 66 on the outside of the collar 63 and the placing of the cooperating threads 65 on the inside of the collar 64.

The term "automotive mechanism" as used in the claims and specifications is used to denote broadly a mechanism which has an engine or other equivalent active unit which by its motion imparts motion to the remainder of the system.

Examples of such a mechanism are automobile, aeroplanes and motor-boats.

The term "fluid system device" as used in the claims and specifications is used to denote broadly the mechanism through which fluids used for cooling the engine or equivalent active unit circulate. An example of a fluid system device is the combined engine and radiator structure of an automobile through which the water or other fluid which cools the engine circulates.

Having described our invention, what we claim as new and useful is:—

1. As an article of manufacture a radiator for use as a member in a fluid system cooling device for automotive vehicles consisting of a plurality of connected hollow members forming a closed circuit for the flow of the cooling fluid, the said radiator consisting of a main body member; a filter device carried by and forming an integral part of the said radiator, a tubular arm carried by the said filter device whereby the said filter device is adapted to be connected to the remainder of the said fluid system cooling device; a filter means for impounding the dirt, dust, rust and other foreign substances carried by the said fluid carried by the said fluid device, the said filter means consisting of a screen, the said screen having a curved cross section, reinforcing means carried by the edges of the said screen, a reinforcing member carried by and attached to the said screen, the said reinforcing member consisting of an upper plate and a front plate; an aperture formed in the said front plate whereby the fluid is permitted to flow into the said screen; a lower portion carried by the said filter device; a collar formed on the said lower portion; a cup removably carried by the said collar and a second collar formed on the said cup; threads formed on each of the said collar, the threads on the said cup collar adapted to cooperate with the said threads on the said lower portion collar whereby the said cup is adapted to be threadably attached to and detached from the said lower portion; a lug carried by one of the members of the said filter device whereby the filter element is held against lateral displacement due to the force of the fluid; a removable plate carried by the said filter device whereby the said filter element is adapted to be inserted into and removed from the said filter device; locking means for locking the said filter element into operative position, the said locking element consisting of a plate and arms carried by the said plate, a lug formed in the said plate, a screw mounted in said lug and lugs carried by the upper and lower members of the said filter device, the said lugs and the said arms cooperating to hold the said locking device against vertical displacement and the said screw cooperating with the said plate to hold the said plate against vertical displacement.

2. As an article of manufacture a radiator for use as a member in a fluid system cooling device for automotive vehicles consisting of a plurality of connected hollow members forming a closed circuit for the flow of the cooling fluid, the said radiator consisting of a main body portion and a filter device for the fluid system cooling device externally carried by the said radiator and forming an integral part of the said radiator; the said filter device consisting of a main body portion terminating in an externally threaded collar, a cup portion having an internally threaded collar formed on the free end thereof, the said threads on the said cup collar being adapted to cooperate with the said threads on the said body portion collar for attaching the said cup to the said body portion, a filter element removably carried by the said main body portion for impounding foreign substances carried by the said fluid, a removable plate carried by the said main body portion whereby the said filter element is adapted to be removed from and inserted into the said filter device, and locking means carried by the said filter device for locking the said removable plate in position.

3. As an article of manufacture a radiator,— for use as a member in a fluid system cooling device for automotive vehicles consisting of a plurality of connected hollow members forming a closed circuit,—the said radiator consisting of a main body portion and a filter device for the fluid of the said fluid system cooling device externally carried by the said main body portion and forming an integral part of the said main body portion; and a threadably detachable receptacle carried by the said filter device for receiving the dirt, dust, rust and other foreign substances impounded by the said filter device.

4. As an article of manufacture a radiator,— for use as a member in a fluid system cooling device for automotive vehicles consisting of a plurality of connected hollow members forming a closed circuit,— the said radiator consisting of a main body portion and a filter device for the fluid of the said fluid system cooling device externally carried by the said main body portion and forming an integral part of the said main body portion; the said filter device consisting of a main body portion having a filter element therein, a lower portion terminating in an externally threaded collar, and a cup portion having an internally threaded collar formed on the free end thereof, the said threads on the said cup collar being adapted to cooperate with the said threads on the said lower portion collar for attaching the said cup to the said lower portion.

5. As an article of manufacture a radiator,— for use as a member in a fluid system cooling device for automotive vehicles consisting of a plurality of connected hollow members forming a closed circuit,—the said radiator consisting of a main body portion and a filter device for the fluid of the said fluid system cooling device externally carried by the said main body portion and forming an integral part of the said main body portion; the said filter device consisting of a main body portion, filter means removably carried by the said main body portion for impounding foreign substances carried by the said fluid, a lug formed on said main body portion for locking the said filter means against lateral displacement, locking means associated with the said filter means for locking the said filter means in position, and a receptacle for receiving the said foreign substances impounded by the said filter means threadably carried by the said body member.

6. As an article of manufacture a radiator,— for use as a member in a fluid system cooling device for automotive vehicles consisting of a plurality of connected hollow members forming a closed circuit,—the said radiator consisting of a main body portion and a filter device for the fluid of the said fluid system cooling device externally carried by the said main body portion and forming an integral part of the said main body portion; the said filter device consisting of a main body portion terminating in an externally threaded collar, a cup portion having an internally threaded collar formed on the free end thereof, the said threads on the said cup collar being adapted to cooperate with the said threads on the said body portion collar for attaching the said cup to the said main body portion, a filter element removably carried by the said main body portion for impounding foreign substances carried by the said fluid, a removable plate carried by the said main body portion whereby the said filter element is adapted to be removed from and inserted into the said filter device, and locking means carried by the said filter device for locking the said removable plate in position.

WALTER NELSON HOLSTRUM.
JOSEPH RENDELMAN.